Patented Aug. 3, 1954

2,685,581

UNITED STATES PATENT OFFICE 2,685,581

ORGANIC PHOSPHORUS COMPOUNDS

Harry W. Coover, Jr., Kingsport, Tenn., assignor to Eastman Kodak Company, Rochester, N. Y., a corporation of New Jersey No Drawing. Application October 8, 1952, Serial No. 313,803

9 Claims. (Cl. 260—248)

This invention relates to new phosphorus-containing compounds. More particularly, this invention relates to new organo-phosphorus compounds of the general type

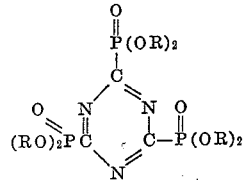

wherein R is lower alkyl or phenyl. These organo-phosphorus compounds are readily prepared by the reaction of molar proportions of cyanuric chloride with a trialkylphosphite or a sodium dialkylphosphite, or the corresponding phenyl phosphites. For example, tri-(diethylphosphono)-triazine may be prepared substantially according to the reaction

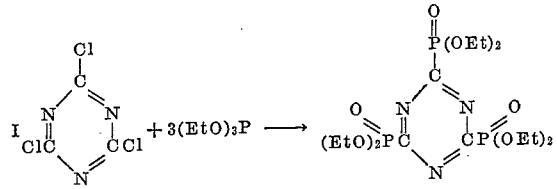

Instead of triethylphosphite as shown in the above equation, there may be employed an alkali metal phosphite such as sodium diethyl-phosphite, or other lower alkyl (such as methyl, propyl, butyl, etc.) phosphites, or phenyl phosphites.

The new class of organo-phosphorus compounds are useful as plasticizers, solvents, insecticides, and intermediates for the preparation of other organo-phosphorus compounds. When used as a plasticizer in cellulose esters, greatly improved flame resistance is observed.

We have found that cyanuric chloride can be reacted with triaryl or triphenyl phosphite, or with an alkali metal dialkyl or diphenyl phosphite to produce novel compounds having the formula first appearing above.

Accordingly it is an object of the invention to provide the new process and products.

The following examples are given in an illustrative but not a limiting sense:

Example 1

Cyanuric chloride, 18.4 parts, and triethyl phosphite, 49.8 parts, were mixed with stirring in a flask equipped with an efficient condenser. A vigorous reaction followed the mixing of the two components and was controlled by submerging the reaction flask in an ice bath. After the spontaneous reaction had subsided, the reaction mixture was carefully heated for one hour just below the reflux temperature. The solid product obtained by cooling the reaction mixture was filtered and washed with ethyl ether. The yield was 42.4 parts of crude material, M. P. 81–84° C. This crude material was recrystallized from cyclohexane or a mixture of cyclohexane and benzene, yielding a product, M. P. 82–84° C., having the structure given in Equation I.

Example 2

Cyanuric chloride, 18.4 parts, and tributyl phosphite, 25.0 parts, were mixed with stirring in a flask equipped with an efficient condenser. A vigorous reaction followed the mixing of the two reactants and was controlled by cooling the reaction flask in an ice bath. After the initial vigorous reaction had subsided, the mixture was heated carefully for one hour just below the reflux temperature. The solid product obtained by cooling the reaction mixture was filtered and washed with ethyl ether. The yield was 57.0 g. of crude material. The crude material may be further purified by recrystallization from cyclohexane or benzene. The product was the same as in Equation I but with butyl in place of the ethyl radicals.

Example 3

Cyanuric chloride, 18.4 parts, and sodium diphenyl phosphite, 76.85 parts, were mixed in enough excess diphenyl hydrogen phosphite to effect solution of the sodium salt. A vigorous reaction followed the mixing of the two reactants and was controlled by cooling the reaction flask in an ice bath. After the initial vigorous reaction had subsided, the mixture was heated carefully for one hour at approximately 100°. The solid product obtained by cooling the reaction mixture was filtered, washed with water to remove the sodium chloride, then with a small amount of ether and dried. The crude material, 65 parts, may be further purified by recrystallization from some suitable solvent such as cyclohexane or benzene. The product was the same as in Equation I, but with phenyl in place of the ethyl radicals.

I claim:

1. A new composition of matter having the structure

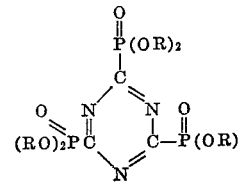

wherein R is selected from the group consisting of lower alkyl and phenyl.

2. A composition according to claim 1 where R is ethyl.

3. A composition according to claim 1 where R is butyl.

4. A composition according to claim 1 where R is phenyl.

5. A process comprising reacting cyanuric chloride with a compound of the formula $(RO)_2POR'$ where R is selected from the group consisting of lower alkyl and phenyl, and R' is selected from the group consisting of alkyl, aryl and alkali metal.

6. A process according to claim 5, wherein, after spontaneous reaction subsides, the reaction mixture is heated at just below the reflux temperature, and is then cooled, filtered and washed.

7. A process according to claim 5, wherein R and R' are lower alkyl.

8. A process according to claim 5, wherein R and R' are phenyl.

9. A process according to claim 5, wherein R' is sodium.

No references cited.